Dec. 29, 1925.  F. C. SMITH ET AL  1,567,624
CONDUIT OUTLET BOX
Filed March 28, 1921    2 Sheets-Sheet 2
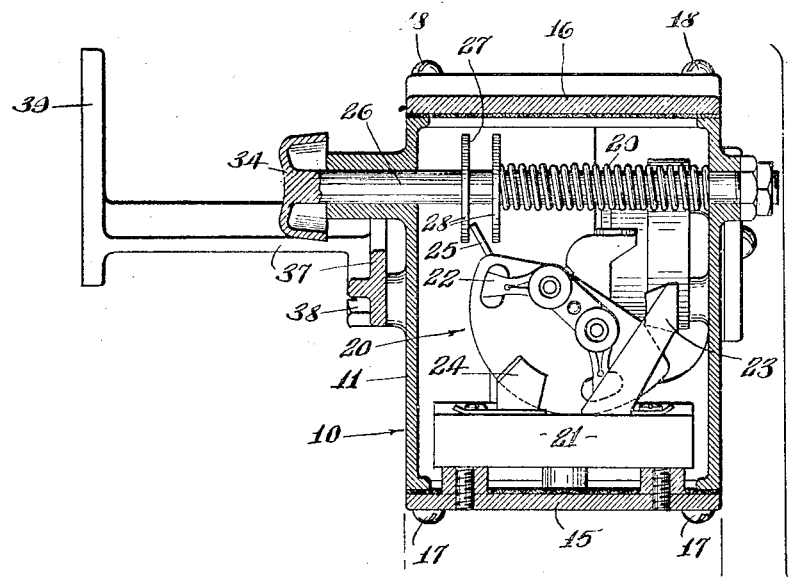
Fig.3.
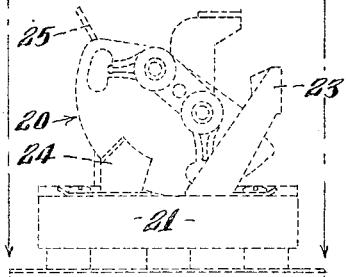
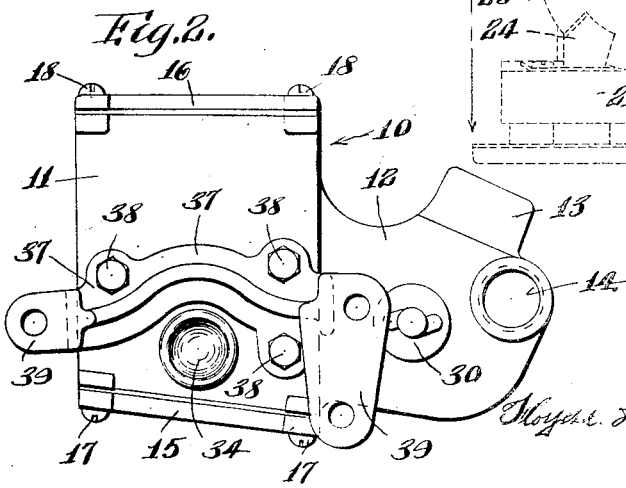
Fig.2.
Floyd C. Smith & Edwin A. Alley
INVENTORS.
BY
Parsons & Bidell.
ATTORNEYS.

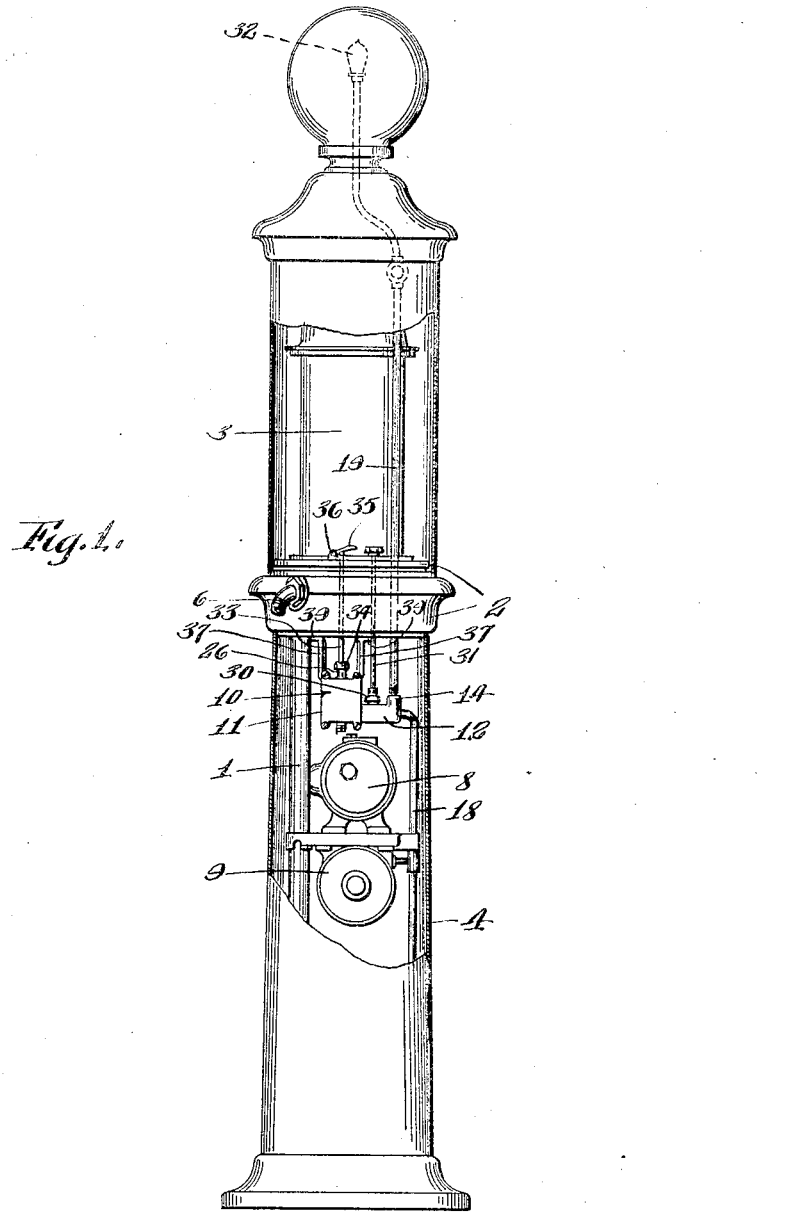

Patented Dec. 29, 1925.

1,567,624

UNITED STATES PATENT OFFICE.

FLOYD C. SMITH AND EDWIN A. OLLEY, OF SYRACUSE, NEW YORK, ASSIGNORS TO CROUSE-HINDS COMPANY, OF SYRACUSE, NEW YORK, A CORPORATION OF NEW YORK.

CONDUIT OUTLET BOX.

Application filed March 28, 1921. Serial No. 456,309.

*To all whom it may concern:*

Be it known that we, FLOYD C. SMITH and EDWIN A. OLLEY, citizens of the United States, and residents of Syracuse, in the county of Onondaga and State of New York, have invented a certain new and useful Conduit Outlet Box, of which the following is a specification.

This invention has for its object a conduit outlet box or housing for the electric switches controlling the lights and pumps or pumping stations used to deliver gasoline into automobiles, motor vehicles, etc. which housing is particularly simple and compact in construction and highly efficient for the purpose intended. The invention consists in the novel features and in the combinations and constructions hereinafter set forth and claimed.

In describing this invention, reference is had to the accompanying drawings in which like characters designate corresponding parts in all the views.

Figure 1 is an elevation of a pumping station embodying our invention which is shown in front elevation.

Figure 2 is a plan view of the conduit outlet box.

Figure 3 is a vertical sectional view thereof.

The class of pumps or pumping stations for which this outlet box is particularly adapted consists of a frame 1, consisting of suitable uprights, a table 2, a reservoir 3 on the table, a pumping mechanism and controlling means therefor, in the lower part of the frame. The lower part of the frame is enclosed in a casing 4. The reservoir 3 is transparent and communicates with an outlet pipe 6 through which the gasoline is delivered to a flexible pipe from whence it runs into the tank of the vehicle. The pumping mechanism includes a suitable pump 8 which is actuated by an electric motor 9 controlled by a switch located within the conduit outlet box 10.

The conduit outlet box 10 as here shown is suspended from the table 2 and comprises a body 11 having a lateral extension 12, the body being here shown as rectangular in form and as having its ends open. The extension 12 extends from one of the lateral sides of the body and opens thereinto, this extension having its bottom substantially flush with the lower side of the body, said extension being of less height than the body. The extension is provided with means as one or more internally threaded nipples 13, 14 for connection to electric conduits enclosing the service wires.

15 and 16 are respectively, closures for the open ends of the body 11, they being secured to the body in any suitable manner as by screws 17. 18, 19 are respectively electric conduits connected to the nipples 13, 14 respectively.

20 designates a switch located within the body for controlling the flow of the electric current to the motor. This switch may be of any suitable form, size and construction and as here shown it is carried on a closure 15.

As here shown the switch includes a base 21 of insulation, a movable switch member 22 mounted on the base and movable to electrically connect and disconnect switch contacts 23, 24 mounted on the base, which contacts are connected respectively to the feed wires and to the terminals of the motor 4. It also includes a member as an arm 25 by means of which the switch member is thrown to open and close the circuit across the contacts 23, 24.

The operating means for the switch member comprises a plunger 26 extending vertically through the body of the box and having means as a groove 27 formed by two collars 28 on the rod, which groove receives the arm 25. The movement of the plunger 26 is against the action of a spring 29 encircling the rod and bearing at one end against the inner face of the bottom of the body of the box and against one of the collars 28.

30 is an ordinary rotary snap switch located within the extension and having operating means as an upwardly extending rod 31 extending above the table from which the box 10 is suspended. This switch 30 controls the lighting of an electric lamp 32 located at the top of the frame, the feed wires to this lamp being enclosed in the conduit 19 connected to the nipple 14 of the box. The switch 30 is placed in the extension through the open end normally closed by the cover 10 and into the extension where the extension opens into the interior of the body of the box.

The plunger or rod 26 as here shown is operated by means of a rod 33 slidable through the table of the frame and resting on the seat 34 at the upper end of the plunger 26 the rod 33 being operable by means of a handle 35 pivoted at 36 to the upper face of the table.

The box 10 is suspended from the table 2 of the frame by means of a yoke 37, the intermediate part of which is secured by screws 38 to the box and the arms of which are secured to the under side of the table of the frame by means of suitable screws passing through holes in lugs 39 at the ends of said arms.

This conduit outlet box is particularly advantageous in that all the electrical connections and switches are grouped together and housed in a particularly simple and compact manner.

What we claim is:

1. The combination of a conduit outlet box, comprising a body open at one end and formed with a laterally extending portion opening into the body and closed at its top, bottom, outer end, and front and rear sides, and being accessible through the open end of the body, the lateral extension being formed with means for connection to a conduit enclosing the service wires, a switch located within the lateral extension, and a switch located within the body, and operating means for the switches respectively, extending above the tops of the lateral extension and the body.

2. A conduit outlet box comprising a body and a lateral extension from the body opening in the interior of the body and provided with means for connection to an electric conduit enclosing the service wires, the body of the box having one end open, a closure for the open end, a switch placeable in the box and into the extension through the open end of the body of the box, and a second switch placeable in the body of the box through the open end, the latter being mounted on and carried by said closure, substantially as and for the purpose set forth.

3. A conduit outlet box comprising a rectangular body open at its front and rear ends, and an extension extending laterally from a lateral side of the body and opening into the interior of the body, the extension being provided with means for connection with electric conduits, closures for the open ends of the body, a switch located in the extension and placeable therein through the body, the switch having an operating member extending upwardly through the top of the extension, a second switch located in the body and caried by one of the closures therefor, and operating means extending vertically through the body and having detachable engagement with the movable switch member, substantially as and for the purpose set forth.

In testimony whereof, we have hereunto signed our names at Syracuse, in the county of Onondaga, and State of New York, this 31st day of August, 1920.

FLOYD C. SMITH.
EDWIN A. OLLEY.